(12) United States Patent
Seo et al.

(10) Patent No.: US 12,355,111 B2
(45) Date of Patent: Jul. 8, 2025

(54) BATTERY CELL INCLUDING PROTECTION MEMBER

(71) Applicant: LG Energy Solution, Ltd., Seoul (KR)

(72) Inventors: Sung Won Seo, Daejeon (KR); Dal Mo Kang, Daejeon (KR); Jeong Oh Moon, Daejeon (KR); Hyeon Ki Yun, Daejeon (KR); Ho June Chi, Daejeon (KR); Jin Yong Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 595 days.

(21) Appl. No.: 17/762,226

(22) PCT Filed: Dec. 8, 2020

(86) PCT No.: PCT/KR2020/017870
§ 371 (c)(1),
(2) Date: Mar. 21, 2022

(87) PCT Pub. No.: WO2021/251569
PCT Pub. Date: Dec. 16, 2021

(65) Prior Publication Data
US 2022/0359961 A1 Nov. 10, 2022

(30) Foreign Application Priority Data
Jun. 8, 2020 (KR) .................. 10-2020-0069119

(51) Int. Cl.
*H01M 50/572* (2021.01)
*H01M 50/502* (2021.01)
*H01M 50/531* (2021.01)

(52) U.S. Cl.
CPC ....... *H01M 50/572* (2021.01); *H01M 50/502* (2021.01); *H01M 50/531* (2021.01)

(58) Field of Classification Search
None
See application file for complete search history.

(56) References Cited

U.S. PATENT DOCUMENTS

| 2010/0015511 | A1 | 1/2010 | Yoo et al. | |
| 2011/0086242 | A1* | 4/2011 | Lee | H01M 50/566 429/7 |

(Continued)

FOREIGN PATENT DOCUMENTS

| CN | 101496194 A | 7/2009 |
| CN | 103367833 A | 10/2013 |

(Continued)

OTHER PUBLICATIONS

Extended European Search Report including Written Opinion for Application No. 20940213.0 dated Apr. 11, 2023, pp. 1-9.

(Continued)

*Primary Examiner* — Lisa S Park
(74) *Attorney, Agent, or Firm* — Lerner David LLP (57) ABSTRACT

The present invention relates to a battery cell that can include an electrode assembly configured with two or more unit stacks connected to each other in series or in parallel, a battery case configured to receive the electrode assembly therein, and an insulative protection member configured to protect an electrode tab portion of the unit stacks. The overall length of the battery case can be three or more times the overall width of the battery case. A positive electrode lead and a negative electrode lead can extend outwards from the battery case protruding in opposite directions. A plurality of unit stacks can be used to implement a long battery cell, and a connection portion at which the plurality of unit stacks are connected is reinforced to improve safety of the battery cell.

8 Claims, 6 Drawing Sheets

(56) References Cited

U.S. PATENT DOCUMENTS

| | | |
|---|---|---|
| 2012/0202105 A1 | 8/2012 | Shinyashiki et al. |
| 2013/0196194 A1 | 8/2013 | Park |
| 2013/0196210 A1 | 8/2013 | Kim et al. |
| 2013/0266839 A1 | 10/2013 | Miura et al. |
| 2013/0323559 A1 | 12/2013 | Yoo et al. |
| 2014/0030579 A1 | 1/2014 | Kim et al. |
| 2017/0274751 A1 | 9/2017 | Obrist et al. |
| 2020/0099033 A1 | 3/2020 | Yim et al. |
| 2020/0127269 A1 | 4/2020 | Park et al. |

FOREIGN PATENT DOCUMENTS

| | | | |
|---|---|---|---|
| CN | 110265616 | * | 9/2019 |
| CN | 209515763 | U | 10/2019 |
| JP | 2007507075 | A | 3/2007 |
| JP | 2012164470 | A | 8/2012 |
| JP | 2013218935 | A | 10/2013 |
| KR | 20070108580 | A | 11/2007 |
| KR | 20070116295 | A | 12/2007 |
| KR | 20130119457 | A | 10/2013 |
| KR | 2013-0140248 | A | 12/2013 |
| KR | 20160131627 | A | 11/2016 |
| KR | 20160132145 | A | 11/2016 |
| KR | 20170076684 | A | 7/2017 |
| KR | 20180007261 | A | 1/2018 |
| WO | 2013141431 | A1 | 9/2013 |

OTHER PUBLICATIONS

International Search Report for PCTKR2020017870 dated Mar. 22, 2021, 2 pgs.

Search Report dated Jun. 27, 2023 from Office Action for Chinese Application No. 202080065495X issued Jun. 29, 2023. 2 pgs.

Search Report dated Aug. 14, 2024 from the Office Action for Chinese Application No. 202080065495.X issued Aug. 21, 2024, 2 pages (see p. 1, categorizing the cited references).

* cited by examiner

BATTERY CELL INCLUDING PROTECTION MEMBER

CROSS-REFERENCE TO RELATED APPLICATIONS

This application is a national phase entry under 35 U.S.C. § 371 of International Application No. PCT/KR2020/017870 filed on Dec. 8, 2020, which claims the benefit of priority to Korean Patent Application No. 10-2020-0069119 filed on Jun. 8, 2020, the disclosures of which are incorporated herein by reference in their entirety.

TECHNICAL FIELD

The present invention relates to a battery cell including a protection member, and more particularly to a battery cell having an electrode assembly, which is constituted by two or more unit stacks, received in a battery case, and including an insulative protection member configured to protect an electrode tab portion of the unit stacks.

BACKGROUND ART

A lithium secondary battery, which is capable of being charged and discharged, is appropriately used as a built-in battery cell, since it is unnecessary to replace a battery cell, and has been applied to various kinds of devices with rapid improvement in stability and rapid increase in capacity thereof.

For example, the lithium secondary battery has been widely used as an energy source for wireless mobile devices, which are small multifunctional products, or wearable devices, which are worn on bodies, and has also been used as an energy source for electric vehicles and hybrid electric vehicles presented as alternatives to existing gasoline and diesel vehicles, which cause air pollution.

In the case in which the lithium secondary battery is used in a thin device, such as a mobile phone, or includes high-output, high-capacity battery cells configured to be disposed at the bottom of an electric vehicle, the lithium secondary battery may be manufactured so as to have a structure in which the lithium secondary battery has a small thickness and a large planar area or a structure in which the overall length of the lithium secondary battery is greater than the overall width of the lithium secondary battery.

In order to manufacture a battery cell having a large planar area or configured such that the overall length of the battery cell is greater than the overall width of the battery cell, as described above, a method of forming an electrode so as to have a large size may be considered. However, this method requires replacement of existing facilities, and therefore plenty of additional expenses and a long time are required.

Patent Document 1 discloses a secondary battery including two or more electrode assemblies located side by side in the state in which a space is provided therebetween, two or more electrode tabs received in the two or more electrode assemblies, and a battery case having at least one receiving portion configured to receive the two or more electrode assemblies therein, wherein a spacer provided in the space between the electrode assemblies is provided with two or more seating portions configured to receive the electrode tabs.

In Patent Document 1, the two or more electrode assemblies are received in the battery case, whereby a battery cell having a large planar area is manufactured, and the spacer is provided in the space between the electrode assemblies in order to support and fix the electrode tabs.

In Patent Document 1, however, the spacer supports and fixes only the electrode tabs. In the case in which the spacer is dislocated from the original position thereof in the battery case, therefore, the electrode tabs may be damaged due to dislocation of the spacer.

Patent Document 2 discloses a secondary battery configured to have a structure in which two or more stacked and folded type unit cells are mounted in a battery case, one or more electrode terminals protrude from opposite ends of each of the unit cells, and the unit cells are mounted in a receiving portion while forming a stacked arrangement structure or a planar arrangement structure in the state in which the electrode terminals are connected to each other.

In Patent Document 2, no separate reinforcement member is added to a connection portion at which the plurality of unit cells received in the battery case are connected to each other, whereby insulation between the unit cells may break due to external impact.

Therefore, there is a necessity for a battery cell having a large planar area or a structure in which the overall length of the battery cell is greater than the overall width of the battery cell, wherein safety of the battery cell is improved while inner short circuit of the battery cell is prevented.

PRIOR ART DOCUMENTS (Patent Document 1) Korean Patent Application Publication No. 2016-0132145 (2016 Nov. 17)

(Patent Document 2) Korean Patent Application Publication No. 2007-0116295 (2007 Dec. 10)

DISCLOSURE

Technical Problem

The present invention has been made in view of the above problems, and it is an object of the present invention to provide a battery cell configured to have a structure in which two or more unit stacks are received in a battery case configured such that the overall length of the battery case is several or more times greater than the overall width of the battery case, whereby the battery cell has a long-cell structure, wherein the battery cell includes a protection member configured to secure insulation between the unit stacks and to prevent an electrode tab portion from being damaged due to external impact.

Technical Solution

A battery cell according to the present invention to accomplish the above object includes an electrode assembly configured to have a structure in which two or more unit stacks are connected to each other in series or in parallel; a battery case configured to receive the electrode assembly therein; and an insulative protection member configured to protect an electrode tab portion of the unit stacks, wherein the battery case has a structure in which the overall length of the battery case is three or more times the overall width of the battery case, and a positive electrode lead and a negative electrode lead extending outwards from the battery case protrude in opposite directions.

In the battery cell according to the present invention, each of the unit stacks may be a stacked type electrode assembly, a stacked and folded type electrode assembly, a laminated and stacked type electrode assembly, or a combination thereof, and each of the unit stacks may have a positive electrode tab bundle constituted by a plurality of positive electrode tabs coupled to each other and a negative electrode tab bundle constituted by a plurality of negative electrode tabs coupled to each other.

In the battery cell according to the present invention, the protection member may be a first protection member added to a connection portion of the electrode assembly at which the unit stacks are connected to each other.

In addition, the protection member may further include a second protection member added to a tab-lead coupling portion of the electrode assembly at which each of the positive electrode lead and the negative electrode lead extending outwards from the battery case and an electrode tab bundle are coupled to each other.

In addition, each of the first protection member and the second protection member may be configured to have a structure that wraps a tab portion and ends of unit stacks adjacent to the tab portion together.

In the battery cell according to the present invention, the first protection member may be formed so as to wrap the tab portion, and the second protection member may be formed so as to wrap the tab-lead coupling portion.

In the battery cell according to the present invention, the protection member may be a third protection member configured to have a structure that wraps a connection portion at which the unit stacks are connected to each other, the positive electrode lead and the negative electrode lead extending outwards from the battery case, and the outer surface of each of the unit stacks.

In the battery cell according to the present invention, the unit stacks may be connected to each other in series, and each of the unit stacks may be configured to have a structure in which a positive electrode tab bundle protrudes in a first direction and a negative electrode tab bundle protrudes in a second direction opposite the first direction.

In the battery cell according to the present invention, the unit stacks may be connected to each other in parallel, the unit stacks may include a first unit stack located at each of opposite ends of the electrode assembly and a second unit stack other than the first unit stack, the first unit stack may be configured to have a structure in which two electrode tab bundles formed at a first electrode protrude in the first direction of the unit stack and the second direction opposite the first direction respectively and in which one electrode tab bundle formed at a second electrode protrudes in the first direction or the second direction, and the second unit stack may be configured to have a structure in which two positive electrode tab bundles and two negative electrode tab bundles protrude in the first direction and the second direction, respectively.

In the battery cell according to the present invention, the width of an electrode tab of the first unit stack protruding outwards from the battery case may be greater than the width of the other electrode tab of the first unit stack and the width of each of electrode tabs of the second unit stack.

In addition, the present invention provides a battery pack including the battery cell as a unit cell.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

Figure 1:
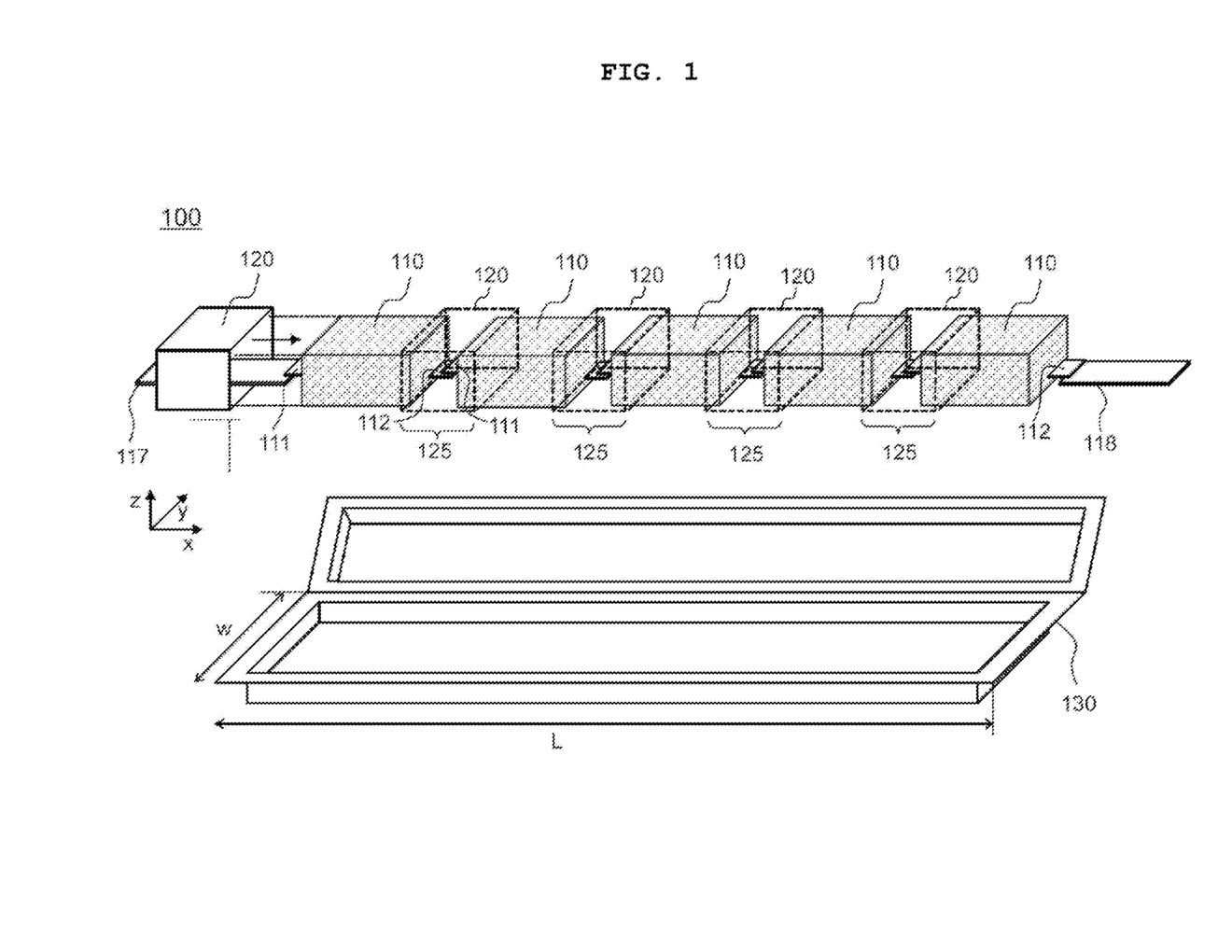
FIG. 1 is an exploded perspective view of a battery cell according to a first embodiment.
Figure 2:
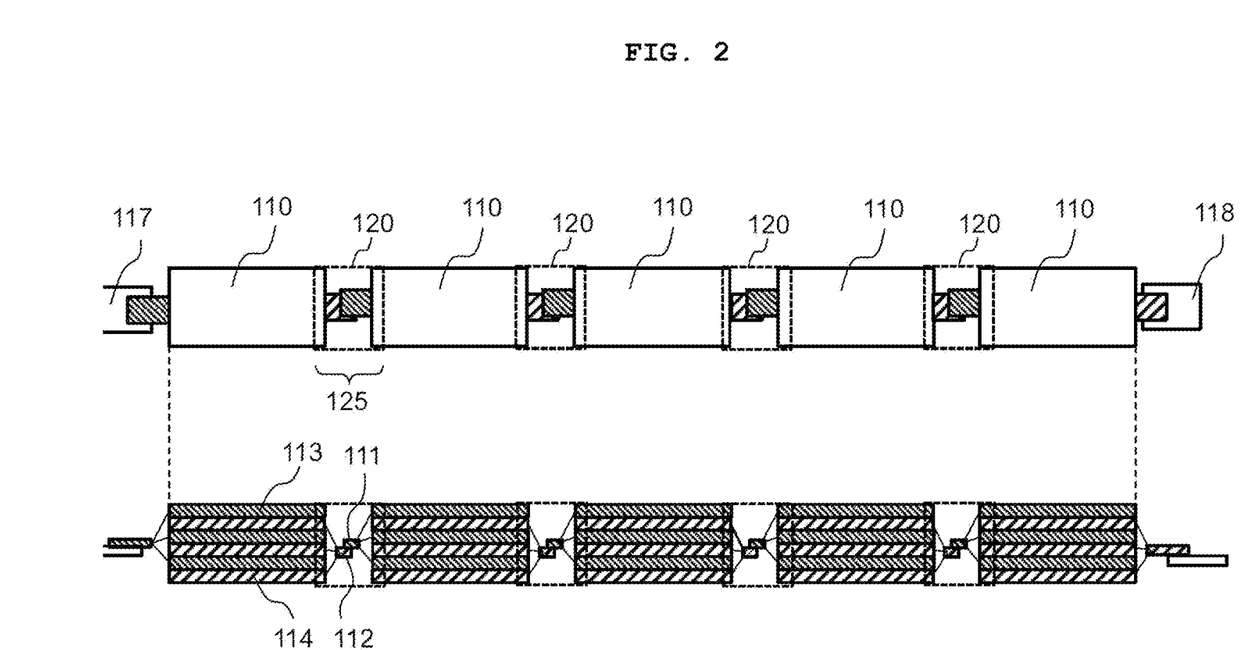
FIG. 2 is a plan view and a side view of an electrode assembly having a protection member of FIG. 1 added thereto.

FIG. 1 is an exploded perspective view of a battery cell according to a first embodiment, and FIG. 2 is a plan view and a side view of an electrode assembly having a protection member of FIG. 1 added thereto.

Referring to FIGS. 1 and 2, the battery cell 100 is configured to have a structure in which five unit stacks 110 electrically connected to each other are received in a pouch-shaped battery case 130 made of a laminate sheet.

The battery case 130 has a structure in which the overall length L of the battery case is three or more times the overall width W of the battery case. Specifically, the overall length of the battery case may be five or more times the overall width of the battery case. As described above, the present invention is capable of providing a battery cell having a relatively long length in one direction.

The battery case according to the present invention is not limited to the pouch-shaped case shown in FIGS. 1 and 2. A structure in which a plurality of unit stacks is received in a prismatic battery case in a state of being connected to each other is also included in the category of the present invention.

In addition, the present invention includes an electrode assembly configured to have a structure in which five unit stacks are received in the battery case 130 in a state of being connected to each other in series or in parallel, rather than an electrode assembly constituted by electrodes having sizes corresponding to the overall length L and the overall width W of the battery case 130.

Consequently, the electrode assembly according to the present invention may be manufactured using two or more unit stacks, each of which is constituted by electrodes each configured such that an x-axis direction length is about 1.5 times a y-axis direction length. Alternatively, the electrode assembly may be manufactured using three or more unit stacks, each of which is constituted by electrodes each configured such that the y-axis direction length and the x-axis direction length are the same.

Each of the unit stacks 110 may be a stacked type electrode assembly, a stacked and folded type electrode assembly, a laminated and stacked type electrode assembly, or a combination thereof. A plurality of unit stacks may be constituted by the same kind of electrode assemblies or different kinds of electrode assemblies. The unit stack 110 shown in FIG. 2 has a structure in which a positive electrode 113 and a negative electrode 114 are stacked. A separator is omitted for convenience of description.

The unit stack shown in FIG. 2 may be a stacked type electrode assembly, a stacked and folded type electrode assembly, or a laminated and stacked type electrode assembly.

Although an electrode assembly configured such that five unit stacks are connected to each other in series is shown in FIG. 1, the number of unit stacks may be differently set.

Each of the unit stacks 110 is configured such that a positive electrode tab bundle 111, constituted by a plurality of positive electrode tabs coupled to each other, and a negative electrode tab bundle 112, constituted by a plurality of negative electrode tabs coupled to each other, are formed so as to protrude in different directions and such that a positive electrode lead 117 and a negative electrode lead 118 extending outwards from the battery case 130 protrude in opposite directions.

When the unit stacks 110 are connected to each other in series, as in the electrode assembly shown in FIGS. 1 and 2, the positive electrodes and the negative electrodes constituting the unit stacks 110 may be constituted by electrodes having the same sizes and shapes, and a positive electrode having a single positive electrode tab formed thereat and a negative electrode having a single negative electrode tab formed thereat may be used.

In order to manufacture a battery cell having a long length, therefore, a positive electrode and a negative electrode manufactured in a single process may be used, and therefore neither an additional process nor a dual process is necessary to manufacture the battery cell having the long length.

Each of the unit stacks 110 is manufactured using a positive electrode having a single positive electrode tab formed thereat and a negative electrode having a single negative electrode tab formed thereat, and a single positive electrode tab bundle 111 and a single negative electrode tab bundle 112 are formed for each individual unit stack.

In each individual unit stack, the single positive electrode tab bundle 111 protrudes in a first direction, and the single negative electrode tab bundle 112 protrudes in a second direction, which is opposite the first direction.

The battery cell according to the present invention includes an insulative protection member configured to protect electrode tab portions of the unit stacks 110. In the electrode assembly of FIGS. 1 and 2, a first protection member 120 is added to a connection portion at which the unit stacks 110 are connected to each other.

FIG. 1 shows that a first protection member 120 that has passed over a positive electrode lead 117 and the leftmost one of the unit stacks 110 is mounted to a connection portion 125, at which the unit stacks 110 are connected to each other.

The positive electrode tab bundle 111 of any one of the unit stacks 110 is coupled to the negative electrode tab bundle 112 of a neighboring one of the unit stacks, and the negative electrode tab bundle 112 of any one of the unit stacks 110 is electrically connected to the positive electrode tab bundle 111 of a neighboring one of the unit stacks. The first protection member 120 is configured to have a structure that wraps a tab portion at which the positive electrode tab bundle and the negative electrode tab bundle are coupled to each other and ends of the opposite unit stacks 110 adjacent to the tab portion together.

In consideration of the fact that the first protection member 120 passes over the unit stack and is disposed at the connection portion, the first protection member 120 may be formed so as to have a size equal to or greater than the perimeter of the unit stack, and the first protection member 120 mounted to the connection portion may be disposed so as to be fixed to the outer surfaces of the ends of the unit stacks. Consequently, the first protection member according to the present invention may be stably fixed without being dislocated from the position at which the first protection member is initially disposed.

Also, in the case in which a space is formed between the first protection member and the tab portion and the first protection member is made of a material capable of maintaining a quadrangular ring shape, as shown in FIG. 1, it is possible to absorb external force applied to the tab portion, and therefore it is possible to prevent damage to the tab portion.

In addition, since the first protection member wraps the ends of the unit stacks, it is possible to prevent the separator from loosening or folding in a process of injecting an electrolytic solution into the battery case.

Figure 3:
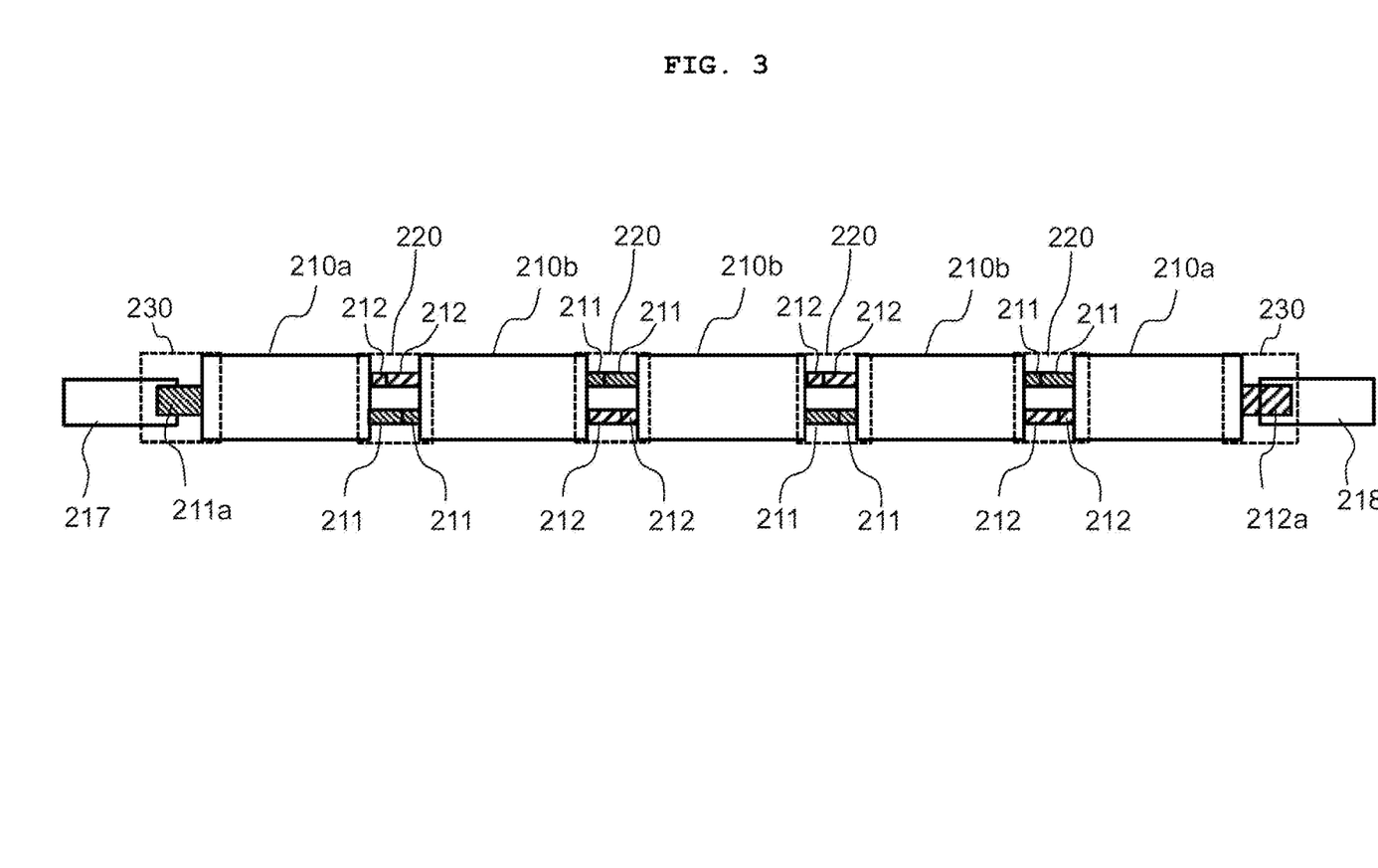
FIG. 3 is a plan view of an electrode assembly having a protection member according to a second embodiment.

FIG. 3 is a plan view of an electrode assembly having a protection member according to a second embodiment added thereto.

Referring to FIG. 3, the electrode assembly is configured to have a structure in which five unit stacks are connected to each other in parallel.

Unlike what is shown in FIG. 3, the number of unit stacks constituting the electrode assembly is not limited to 5, and the electrode assembly may be constituted by less than five unit cell stacks or more than five unit stacks.

Since the unit stacks are connected to each other in parallel in the electrode assembly shown in FIG. 3, the number of electrode tabs is changed, compared to the unit stacks shown in FIGS. 1 and 2.

Specifically, the unit stacks are constituted by first unit stacks 210a located at opposite ends of the electrode assembly and second unit stacks 210b located in the electrode assembly excluding the opposite ends thereof. That is, the second unit stacks 210b are unit stacks other than the first unit stacks 210a.

Since one of the two first unit stacks 210a that is located at the left end includes a positive electrode having two positive electrode tabs formed thereat and a negative electrode having one negative electrode tab formed thereat, two positive electrode tab bundles 211a and 211 and one negative electrode tab bundle 212 are formed.

The two positive electrode tab bundles 211a and 211 protrude in the first direction and the second direction, which are opposite directions, and the negative electrode tab bundle 212 protrudes in a direction toward the second unit stacks 210b.

In consideration of the rate performance and resistance of a battery cell, the width of the positive electrode tab bundle 211a may be formed so as to be greater than the width of the positive electrode tab bundle 211.

Since the first unit stack 210a located at the right end of the electrode assembly includes a positive electrode having one positive electrode tab formed thereat and a negative electrode having two negative electrode tabs formed thereat, one positive electrode tab bundle 211 and two negative electrode tab bundles 212 and 212a are formed.

The two negative electrode tab bundles 212 and 212a protrude in the first direction and the second direction, which are opposite directions, and the positive electrode tab bundle 211 protrudes in a direction toward the second unit stacks 210b.

In consideration of the rate performance and resistance of the battery cell, the width of the negative electrode tab bundle 212a may be formed so as to be greater than the width of the negative electrode tab bundle 212.

Meanwhile, the width of the positive electrode tab bundle 211 and the width of the positive electrode tab bundle 211a may be formed so as to be equal to each other, and the width of the negative electrode tab bundle 212 and the width of the negative electrode tab bundle 212a may be formed so as to be equal to each other.

In the case in which the widths of the positive electrode tab bundles 211a and 211 are equal to each other and the widths of the negative electrode tab bundles 212 and 212a are equal to each other, as described above, it is possible to manufacture a second unit stack 210b having two positive electrode tab bundles and two negative electrode tab bundles formed thereat using a positive electrode and a negative electrode manufactured through a single process. In addition, each of the first unit stacks 210a disposed at opposite ends of the electrode assembly may be manufactured through a process of removing any one of one negative electrode tab bundle and one positive electrode tab bundle from the second unit stack 210b.

Since the second unit stack 210b is connected to unit stacks neighboring thereto in parallel, the second unit stack includes a positive electrode having two positive electrode tabs formed thereat and a negative electrode having two negative electrode tabs formed thereat. Consequently, two positive electrode tab bundles 211 and two negative electrode tab bundles 212 are formed at the second unit stack 210b. The two positive electrode tab bundles 211 protrude in the first direction and the second direction, which are opposite directions, and the two negative electrode tab bundles 212 protrude in the first direction and the second direction, which are opposite directions.

A first protection member 220 and a second protection member 230 are added to the electrode assembly shown in FIG. 3. The first protection member 220 may be added to each of a connection portion at which the first unit stack 210a and the second unit stacks 210b are connected to each other and a connection portion at which the second unit stacks 210b and the second unit stacks 210b are connected to each other, and the second protection member 230 may be added to a tab-lead coupling portion at which each of a positive electrode lead 217 and a negative electrode lead 218 extending outwards from the battery case and the electrode tab bundle are coupled to each other.

That is, at each of a portion at which the positive electrode lead 217 is coupled to the positive electrode tab bundle 211a and a portion at which the negative electrode lead 218 is coupled to the negative electrode tab bundle 212a, the second protection member 230 may be added to the outer surface of each of the positive electrode lead 217 and the negative electrode lead 218 received in the battery case.

The second protection member 230 may be formed so as to have the shape of a quadrangular ring, the shape of which is maintained as in the first protection member 220, and may be formed so as to be greater than the perimeter of each of the first unit stack 210a and the second unit stacks 210b, or may be formed so as to have a size at which the second protection member is fixed to the outer surface of each of the unit stacks 210a and 210b in tight contact therewith.

In describing the function of the second protection member, a description of the first protection member may be equally applied to the second protection member.

Figure 4:
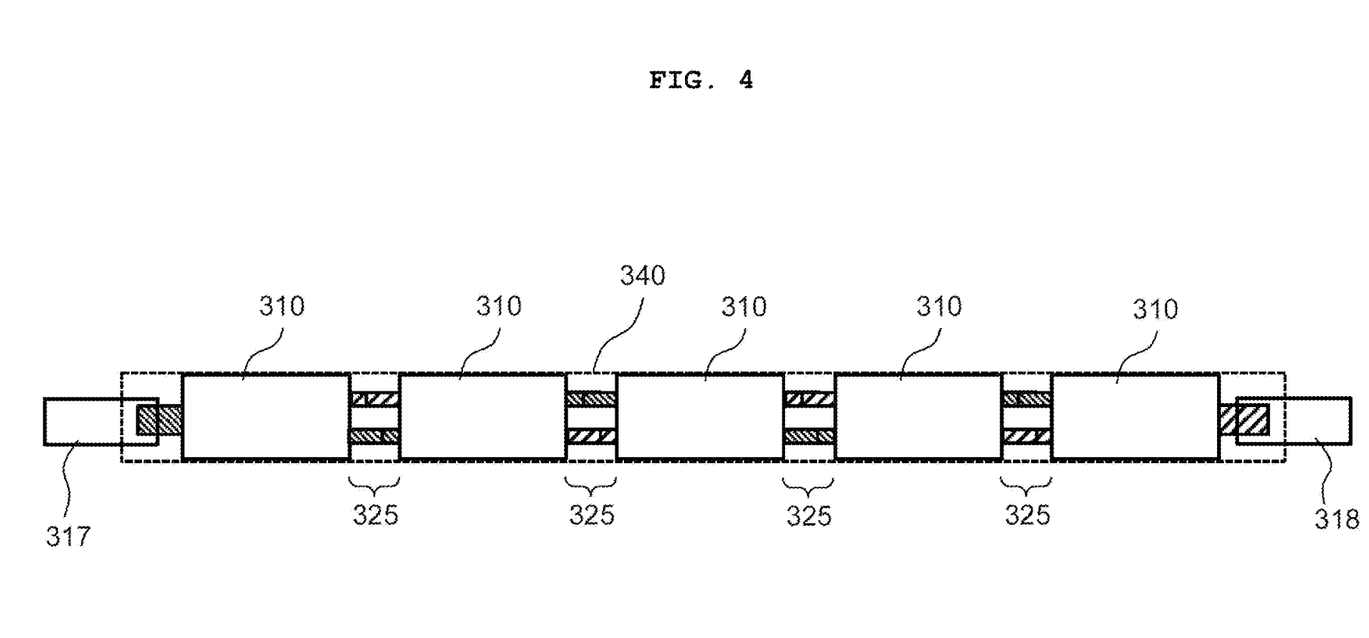
FIG. 4 is a plan view of an electrode assembly having a protection member according to a third embodiment.

FIG. 4 is a plan view of an electrode assembly having a protection member according to a third embodiment added thereto.

Referring to FIG. 4, the electrode assembly is an electrode assembly having the same structure as the electrode assembly of FIG. 3, wherein five unit stacks 310 are connected to each other in parallel.

Consequently, a description of the electrode assembly given with reference to FIG. 3 may be equally applied to the electrode assembly of FIG. 4.

A third insulative protection member 340 configured to protect electrode tab portions of the unit stacks 310 is added to the electrode assembly of FIG. 4. The third protection member 340 is configured to have a structure that wraps a connection portion 325 at which the unit stacks 310 are connected to each other, a positive electrode lead and a negative electrode lead extending outwards from a battery case, and the outer surface of each of the unit stacks 310.

That is, the third protection member 340 may be configured to have a structure that wraps the entirety of the outer surface of the electrode assembly excluding the positive electrode lead 317 and the negative electrode lead 318 extending outwards from the battery case.

In the case in which the third protection member 340 having the above structure is used, the third protection member wraps the entirety of the outer surface of the electrode assembly, which is constituted by the plurality of unit stacks. Consequently, it is possible to obtain a uniform thickness of the electrode assembly, and therefore it is possible to prevent the outer surface of the battery case from being bent or curved.

In addition, it is possible to secure rigidity of the electrode assembly due to addition of the third protection member, and therefore it is possible to prevent damage to the electrode assembly as well as the electrode tab portions due to force applied to the outer surface of the electrode assembly.

Figure 5:
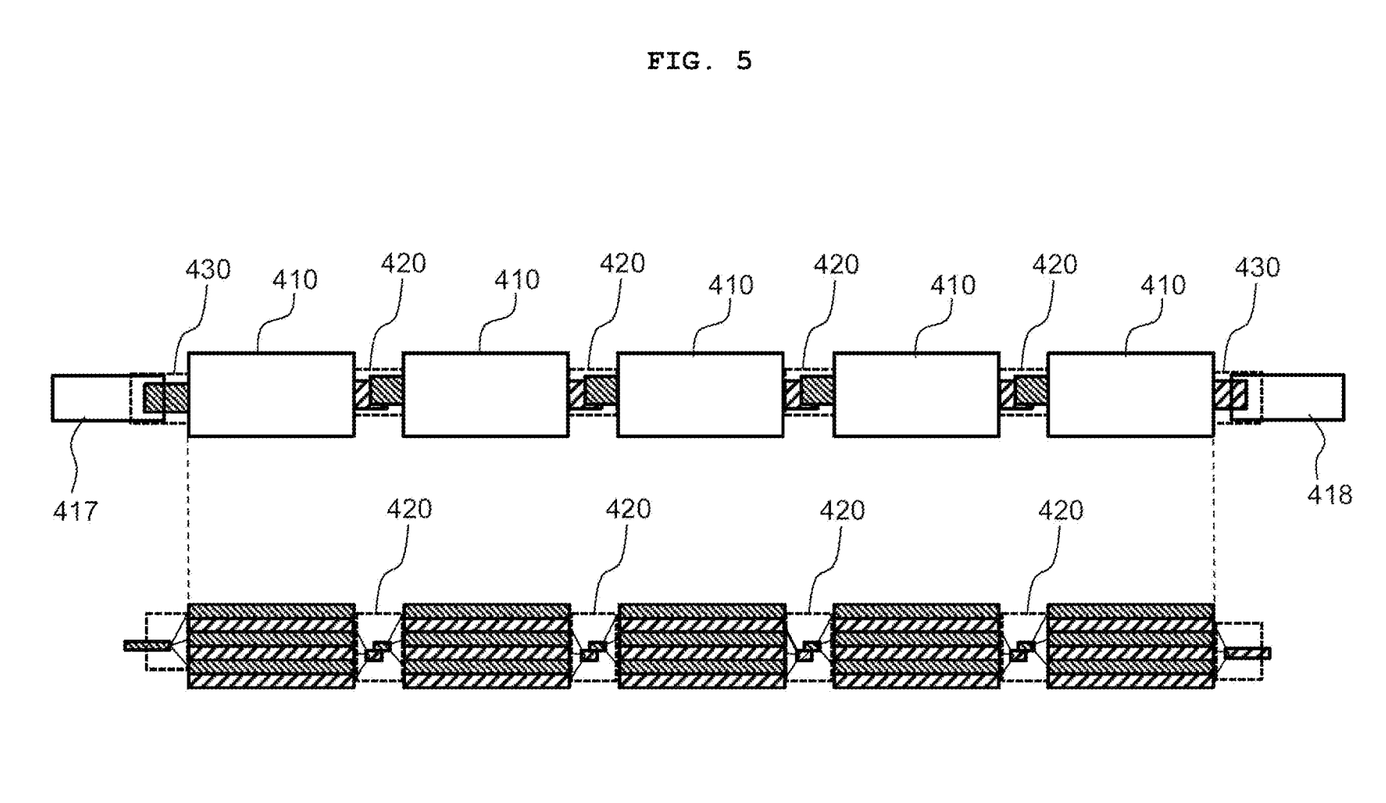
FIG. 5 is a plan view and a side view of an electrode assembly having a protection member according to a fourth embodiment.

FIG. 5 is a plan view and a side view of an electrode assembly having a protection member according to a fourth embodiment added thereto.

Referring to FIG. 5, the electrode assembly has the same structure as the electrode assembly shown in FIGS. 1 and 2. Consequently, a description of the electrode assembly given with reference to FIGS. 1 and 2 may be equally applied to the electrode assembly according to this embodiment.

A first protection member 420 and a second protection member 430 are added to the electrode assembly of FIG. 5.

The first protection member 420 is added to a connection portion at which unit stacks 410 are connected to each other, and the second protection member 430 is added to a tab-lead coupling portion connected to each of a positive electrode lead 417 and a negative electrode lead 418 extending outwards from a battery case.

The first protection member 420 is formed so as to wrap a tab portion, and the second protection member 430 is formed so as to wrap the tab-lead coupling portion.

Specifically, the perimeter of each of the first protection member 420 and the second protection member 430 is less than the perimeter of each unit stack 410. The width and the height of each of the first protection member 420 and the second protection member 430 are formed so as to be less than the width and the height of the unit stack 410.

Consequently, it is possible to secure rigidity of the electrode tab portion and the tab-lead coupling portion due to the first protection member 420 and the second protection member 430, and, since the portions to which the first protection member 420 and the second protection member 430 are added do not protrude from the outer surface of the battery case, the thickness of a battery cell is not increased even in the case in which the protection members are added.

In a concrete example, each of the first protection member 420 and the second protection member 430 may be implemented by a thermally shrinkable tube. The thermally shrinkable tube may be added to the outer surface of each of the tab portion and the tab-lead coupling portion in tight contact therewith as a result of instantaneous shrinkage. In order to prevent the occurrence of short circuit due to contact between adjacent electrode tab bundles during a shrinkage process, as described above, it is preferable for these protection members to be applied to an electrode assembly in which a plurality of unit stacks is connected to each other in series, rather than an electrode assembly in which a plurality of unit stacks is connected to each other in parallel.

Figure 6:
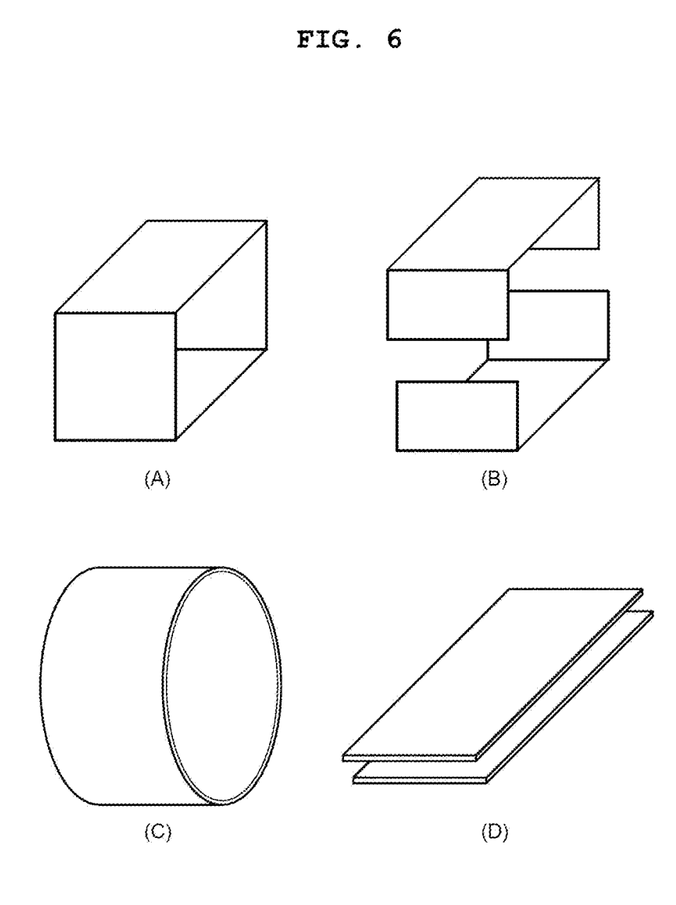
FIG. 6 is a perspective view of various shapes of protection members.

FIG. 6 is a perspective view of various shapes of protection members.

Referring to FIG. 6, an (A) type protection member may have a size greater than the perimeter of a unit stack so as to be mounted while passing over the unit stack.

A (B) type protection member, which is constituted by a pair of detachable structures, may not only be formed so as to have a perimeter less than the perimeter of a unit stack, as shown in FIG. 5, but also may be applied to an electrode assembly having the (A) type protection member added thereto depending on the perimeter of the protection member. That is, a pair of protection members may be coupled to each other in the state in which the pair of protection members is disposed at a connection portion.

A (C) type protection member may be a thermally shrinkable tube, and may be applied to all types of protection members shown in FIGS. 1 to 5.

A (D) type protection member may be constituted by two sheets of film, which may be attached to each other by heating and pressing in a state of being disposed at the upper part and the lower part of each of an electrode tab portion and a tab-lead coupling portion, or each of which may be provided with an adhesive layer, wherein the two sheets of film may be attached to each other after the two sheets of film are disposed such that the adhesive layers face each other.

The present invention provides a battery pack including a battery cell including an electrode assembly having the protection member added thereto as a unit cell.

The battery cell is configured to have a structure in which the overall length of the battery cell is greater than the overall width of the battery cell and in which a protection member capable of preventing short circuit is added to the battery cell, whereby safety of the battery cell is improved. The battery cell may be applied to a device that requires high capacity and high output, as in an electric vehicle or a hybrid electric vehicle, and that has a low and long space such that the battery pack can be disposed therein.

Those skilled in the art to which the present invention pertains will appreciate that various applications and modifications are possible within the category of the present invention based on the above description.

DESCRIPTION OF REFERENCE SYMBOLS

100: Battery cell
110, 310, 410: Unit stacks
111, 211, 211a: Positive electrode tab bundles
112, 212, 212a: Negative electrode tab bundles
113: Positive electrode
114: Negative electrode
117, 217, 317, 417: Positive electrode leads
118, 218, 318, 418: Negative electrode leads
120, 220, 420: First protection members
125, 325: Connection portions
130: Battery case
210a: First unit stack
210b: Second unit stack
230, 430: Second protection members
340: Third protection member
W: Overall width
L: Overall length

INDUSTRIAL APPLICABILITY

As is apparent from the above description, a battery cell according to the present invention uses an electrode assembly configured to have a structure in which several unit stacks, each of which is constituted by small electrodes, are connected to each other, rather than an electrode assembly constituted by electrodes having sizes corresponding to the size of a receiving portion of a battery case of the battery cell, even in the case in which a battery cell configured to have a structure in which the overall length of the battery cell is several times greater than the overall width of the battery cell is implemented. Consequently, it is not necessary to separately manufacture an electrode configured to have a structure in which the overall length of the electrode is greater than the overall width of the electrode.

That is, existing battery cell manufacturing equipment can be used without change, and therefore no additional cost and time for constructing production facilities is necessary.

In addition, a protection member configured to protect an electrode tab portion of the unit stacks has a structure that wraps a tab portion at which electrode tab bundles are located and ends of unit stacks adjacent to the tab portion together, whereby the position of the protection member may be fixed.

In addition, since the protection member is used, it is possible to protect the tab portion from external force.

Also, in a battery pack including a large battery cell according to the present invention, it is possible to reduce the number of battery cells received therein on the assumption that the sizes of battery pack housings are equal to each other. Consequently, it is possible to reduce the number of connection members used to electrically connect the battery cells to each other, whereby it is possible to increase energy density of the battery pack.

The invention claimed is:

1. A battery cell comprising:
an electrode assembly including two or more unit stacks connected to each other in series or in parallel;
a battery case to receive the electrode assembly therein; and
an insulative protection member to protect an electrode tab portion of the unit stacks,
wherein an overall length of the battery case is three or more times an overall width of the battery case, a positive electrode lead and a negative electrode lead of the electrode assembly extending outwards from the battery case to protrude in opposite directions,
wherein the protection member includes a first protection member disposed over a connection portion of the electrode assembly, the unit stacks being connected to each other at the connection portion, the first protection member defining an opening equal to or greater than a perimeter of the unit stacks such that the first protective member contacts an outer surface of the unit stacks.

2. The battery cell according to claim 1, wherein each of the unit stacks is any of a stacked type electrode assembly, a stacked and folded type electrode assembly, a laminated and stacked type electrode assembly, and any combination thereof, each of the unit stacks including a positive electrode tab bundle constituted by a plurality of positive electrode tabs coupled to each other and a negative electrode tab bundle constituted by a plurality of negative electrode tabs coupled to each other.

3. The battery cell according to claim 1, wherein the protection member further comprises a second protection member added to a tab-lead coupling portion of the electrode assembly, each of the positive electrode lead and the negative electrode lead extending outwards from the battery case being coupled to a corresponding electrode tab bundle at the tab-lead coupling portion.

4. The battery cell according to claim 3, wherein each of the first protection member and the second protection member includes a structure that wraps a tab portion and ends of unit stacks adjacent to the tab portion together.

5. The battery cell according to claim 3, wherein the first protection member wraps a tab portion, and the second protection member wraps the tab-lead coupling portion.

6. The battery cell according to claim 2, wherein the unit stacks are connected to each other in series, each of the unit stacks including a positive electrode tab bundle protruding in a first direction and a negative electrode tab bundle protruding in a second direction opposite the first direction.

7. The battery cell according to claim 2, wherein the unit stacks are connected to each other in parallel, the unit stacks comprising first unit stacks located at opposite ends of the electrode assembly and a second unit stack therebetween, the first unit stacks including a first electrode and a second electrode, the first electrode including two positive electrode tabs protruding in a first direction and a second direction opposite the first direction forming two positive electrode tab bundles, the second electrode including a negative electrode tab bundle protruding in the first direction or the second direction, the second unit stack including two positive electrode tab bundles and two negative electrode tab bundles protruding in the first direction and the second direction, respectively.

8. The battery cell according to claim 7, wherein a width of a first electrode tab of the first unit stack protruding outwards from the battery case is greater than a width of a second electrode tab of the first unit stack and a width of each electrode tab of the second unit stack.

* * * * *